United States Patent [19]

Burry

[11] 4,181,063

[45] Jan. 1, 1980

[54] PANTOGRAPH MACHINE

[76] Inventor: Arthur A. Burry, 77 Howard St., Penthouse 2, Toronto, Ontario, Canada

[21] Appl. No.: 827,181

[22] Filed: Aug. 23, 1977

[30] Foreign Application Priority Data

Aug. 23, 1976 [GB] United Kingdom ............... 35058/76

[51] Int. Cl.[2] ............................................. B23C 1/18

[52] U.S. Cl. ..................................................... 409/88

[58] Field of Search ...................... 90/13.7, 13.6, 13.4, 90/13 R; 33/23 R

[56] References Cited

U.S. PATENT DOCUMENTS

| | | | |
|---|---|---|---|
| 732,472 | 6/1903 | Trentzsch | 90/13.7 |
| 2,353,874 | 7/1944 | Buchanan | 90/13.7 |
| 3,719,121 | 3/1973 | Okell et al. | 90/13.7 |

*Primary Examiner*—Gil Weidenfeld

*Attorney, Agent, or Firm*—Sughrue, Rothwell, Mion, Zinn and Macpeak

[57] ABSTRACT

A pantograph machine is provided for producing either by enlargement or reduction copies from a master model. A tracing head and cutting head move together but relatively. The cutting head moves in a rotary manner and the translation of the relative motion between the cutting head and the tracing head is variable to accommodate different contours with a minimum of damage and faithfulness of reproduction.

3 Claims, 7 Drawing Figures

PANTOGRAPH MACHINE

BACKGROUND OF THE INVENTION

This invention relates to engraving machines and more particularly to such machines as are known as pantographs.

It has been a common practice in the engraving industry to produce an original master model from which further models may be produced.

These further models are normally or frequently reduced in size. Reduction from a master, depending on the characteristics of the master are frequently very difficult, time-consuming and expensive.

The principal variables which have to be contended with are the relative overall size of the reproduction to the model; the relative depth of the reproduction to model; and the angle of inclination of the walls of both the model and the reproduction. These variables have made reproduction costly and in operations where a large number of models are used there is a considerable wastage in originals. The form of wastage results from the inability of the tracing stylus to accommodate abrupt changes in the contours of the master model.

In the prior art a tracing stylus and a cutting stylus moved in parallel across the faces of the master model and the workpiece, respectively, so that the cutting head, theoretically reproduced the master traced by the tracing stylus.

These abrupt changes previously referred to led to higher impact collisions between the tracing stylus and the master contours so that the master is frequently chipped, and with continuous usage loses its original sharp definition.

In the alternative a highly-skilled operator had to be continuously present to watch and manage the machine so that specs could be altered to accommodate the changes in contours. Again this was not satisfactory because it produced variations in the reproduction and damage could not always be avoided.

At the other end of the spectrum the contours of the master model may be relatively simple and smooth to follow so that while the problem of damage may be greatly reduced there is an enhanced problem of reproduction—the reproduction may lack definition such that a further reproduction may not be accurately copied or cast therefrom. Again an operator was required to ensure definition through variations in speed.

SUMMARY OF THE INVENTION

To overcome these various difficulties there is provided in accordance with the present invention a pantograph machine for producing a copy of a master model which comprises:

a first centre, a tracing station; and a cutting station, said tracing station including a means for holding said master model and a tracing head engageable with an adjacent surface of said master model, said cutting station including means for holding a blank upon which said master is to be reproduced and a cutting head for cutting said copy on said blank;

means for moving said tracing head and said cutting head through a first arc about said first centre;

individual means for maintaining said tracing head and said cutting head in respective engagement with their master and blank, respectively, and means for translating movement of said tracing head in a lateral direction into movement of said cutting head in a corresponding direction, means for imparting a rotary cutting motion to said cutting head; and means for varying the relative travel of said cutting head and said tracing head in a lateral direction to vary the depth and cut of said cutting head on said blank relative to the depth of cut on said master model.

The machine of the present invention permits fully automatic operation with a very simple, inexpensive mechanism and reduces wastage which arises from damage. These objects are accomplished by providing a variable cutting depth and speed substantially independent of the lateral movement of the tracing stylus. The cutting head travel and speed may be altered relative to the tracing head travel and speed so that the tracing head may follow the contours more accurately and the response of the cutting head reduced or exagerrated depending on the needs of the particular engraving.

These objects and features will be more easily understood from the following description and drawings in which a specific preferred embodiment is illustrated by way of example, and in which.

For the purposes of this specification and claims for the sake of clarity the term "horizontal" movement is employed to designate movement of the tracing head and the cutting head which is predominately through or in a vertical plane passing through all of the centres, and the term "lateral" movement is used to designate movement predominately in a direction normal to the aforesaid vertical plane.

The "horizontal" plane movement and the "lateral" plane movement both involve movements which are complex but it is believed that the use of these terms serve to identify the principal directions of movement.

Figure 1:
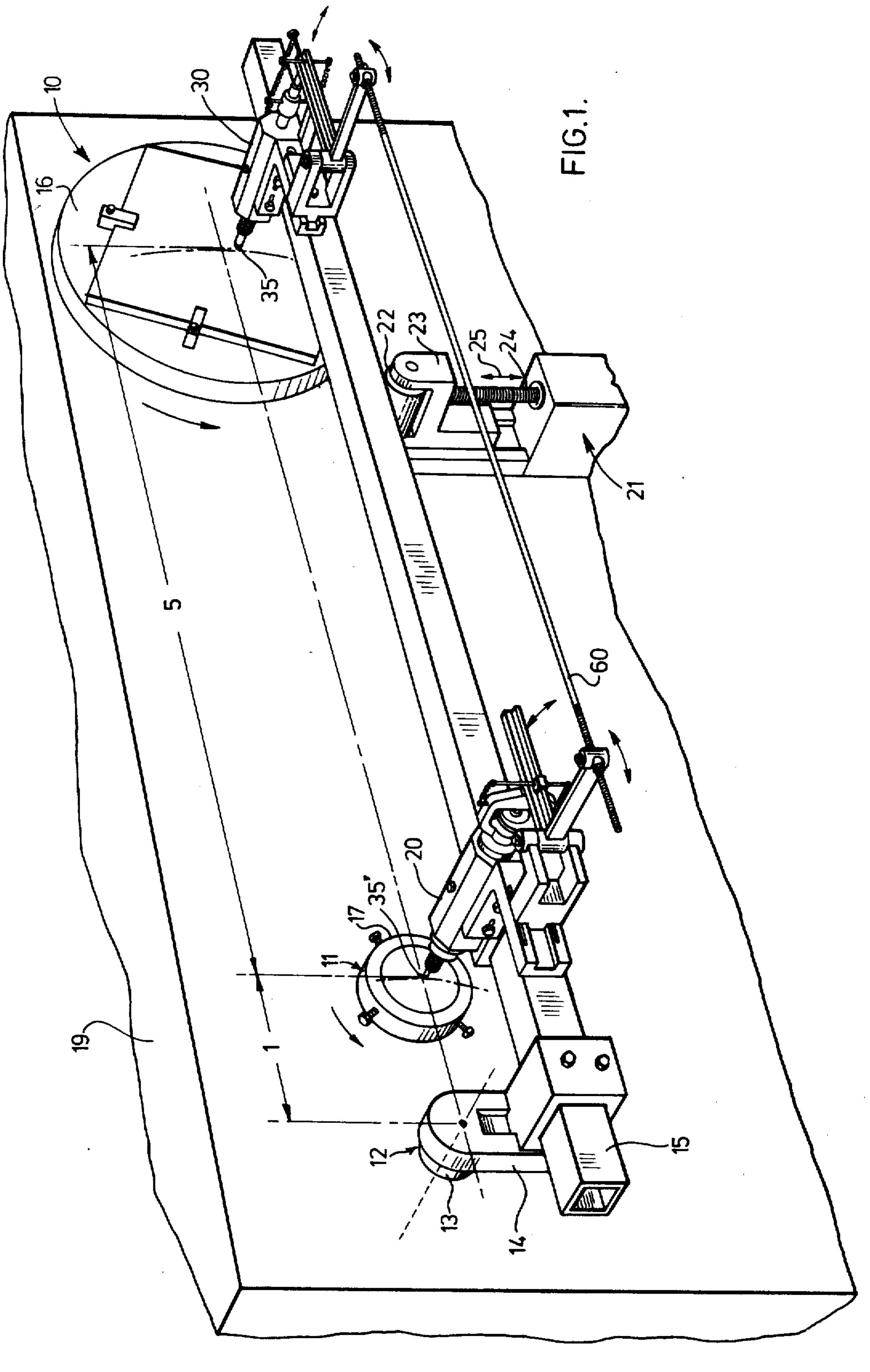
FIG. 1 is a general view of pantograph machine in accordance with the present invention.
Figure 2:
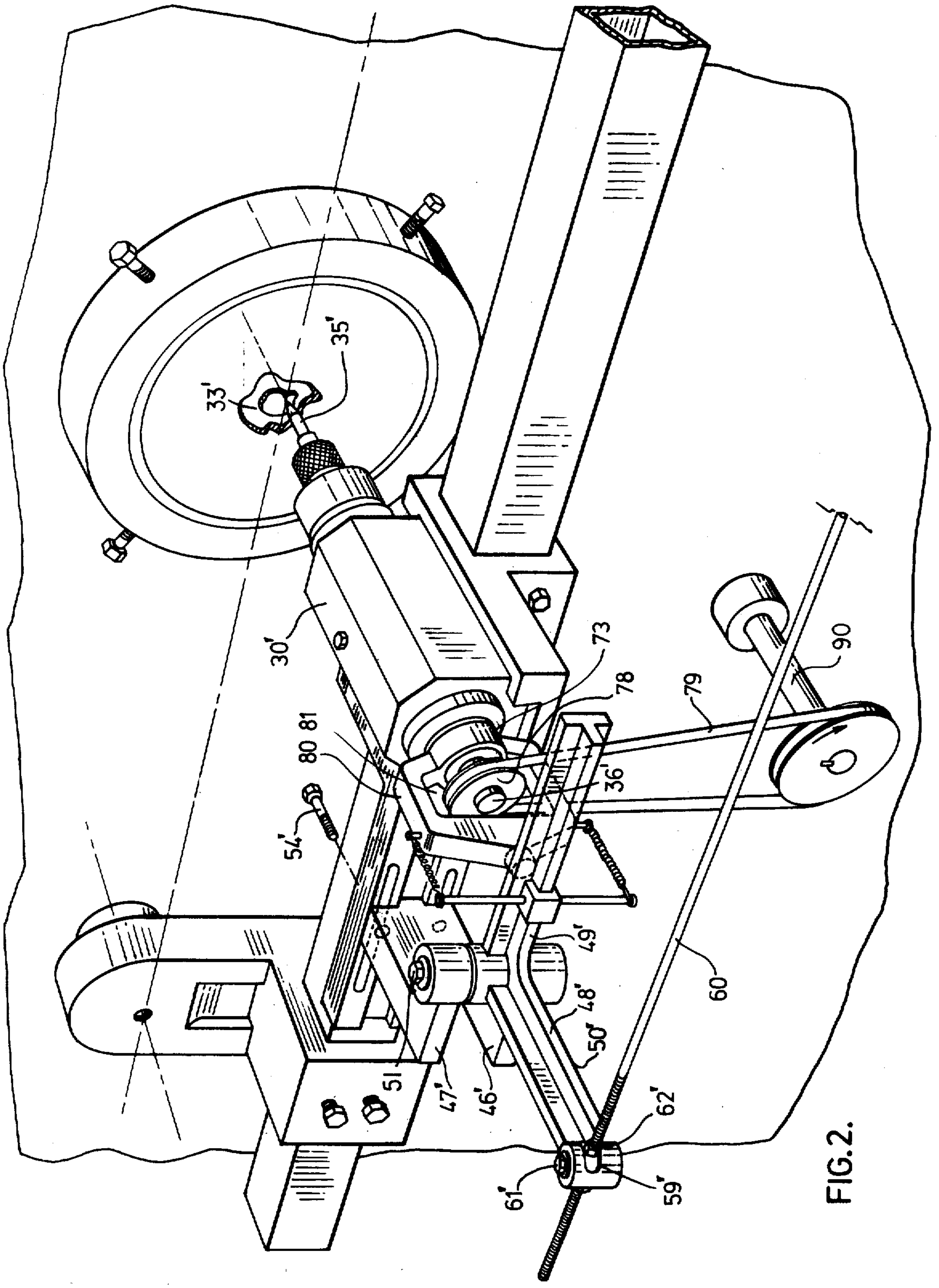
FIG. 2 is an enlarged perspective view of the cutting head station of the embodiment illustrated in FIG. 1.

As I mentioned previously, FIG. 1 illustrates a general view of a pantograph machine in accordance with the present embodiment.

As shown, the machine comprises essentially the tracing station 10, a cutting station 11 and the centre 12. On centre 12 a spindle 13 is mounted and upon spindle 13 arm 14 rotatably supports a bar 15.

The tracing station 10 and the cutting station 11 are each provided with rotatable work piece holders in the form of chucks 16 and 17 respectively. These rotate about centres in the same horizontal plane as each other and the spindle 13.

Within housing 19 motor means, not shown, are provided to drive chucks 16 and 17, a cutting head 20 and bar support 21.

Bar 15 is supported by the bar support 21 which comprises a roller 22 which is in turn supported by U-shaped arm 23. U-shaped arm 23 is mounted on a worm gear 24 and moves in the direction of the arrow 25 in accordance with the desires of the operator. This worm 24 is driven at the predetermined speed and in the predetermined direction to move the tracing head and cutting head across the surface of the work pieces. On bar 15 a tracing head 30 and cutting head 20 are mounted.

Figure 3:
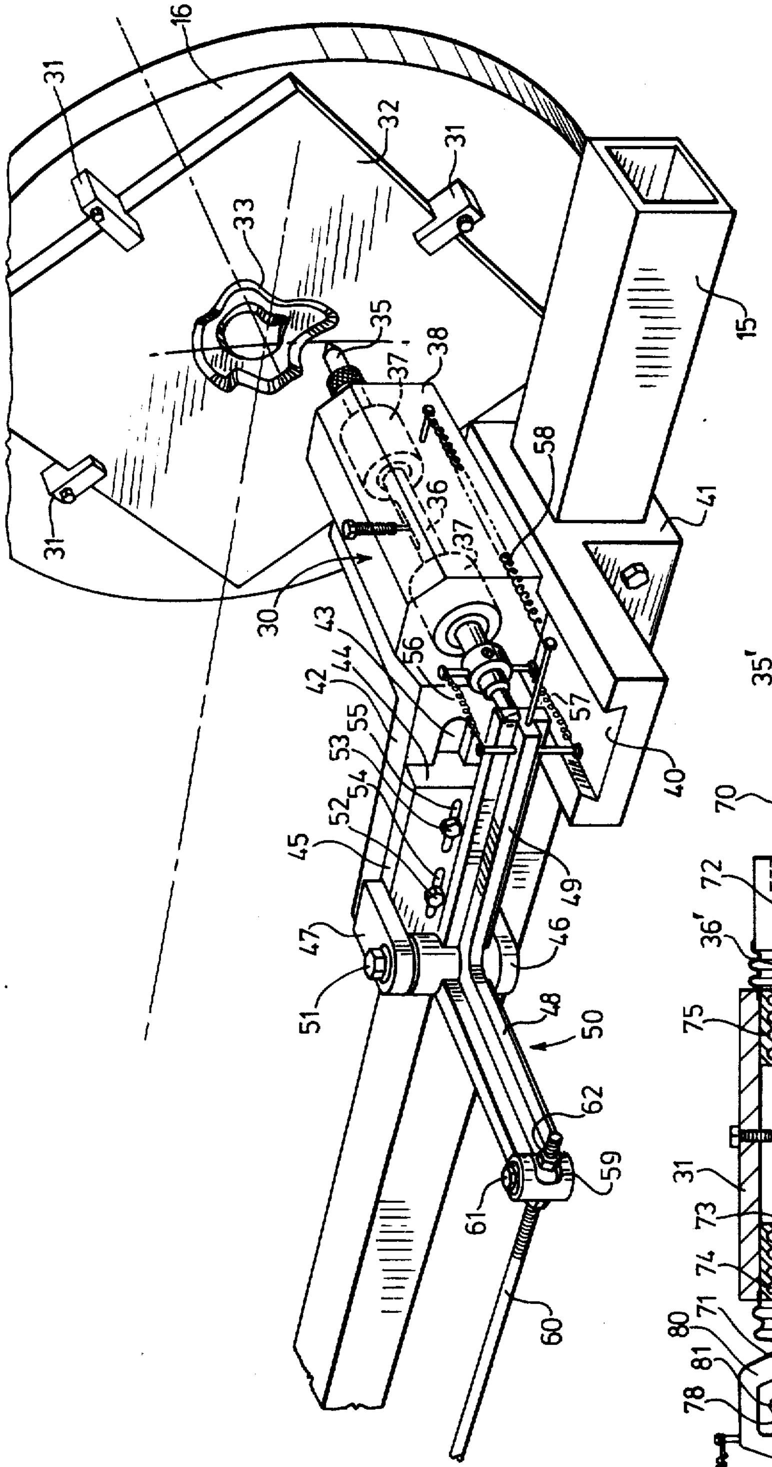
FIG. 3 is an enlarged perspective view of the tracing head station of the embodiment illustrated in FIG. 2.

As shown in FIG. 3 work piece holder 16 is provided with clamps such as 31 which serve to secure a master model 32 upon which an engraving such as 33 has been provided. The tracing head 30 comprises a tracing stylus 35 which is removably mounted on a shaft 36 supported on linear bearing such as 37 in a housing 38. Housing 38 is in turn supported on the bar or carriage 15. This support is achieved by a tongue on the base of housing 38 engaging with a channel or groove 40 on channel member 41. It will be understood that the relative positions of housing 38 and channel 40 may be adjusted either towards or away from the work piece depending upon the needs of the particular form to be traced. Also on channel 41 an angle 42 is mounted. Angle 42 is provided with a channel 43 which is engagable with a tongue 44 on plate 45. Plate 45 in turn supports spaced apart arms 46 and 47 between which arms 48 and 49 of an angle member 50 is supported by a spindle 51. The relative position of plate 45 an angle 42 may be adjusted by screws 52 and 53 which extend through slots 54 and 55 in plate 45 to engage the angle 42. The free end of arm 49 is held in engagement with the adjacent arm of spindle 36 by means of two sets of springs 56 and 57 and spring 58 serves to maintain the tracing stylus 35 in engagement with the work piece 33.

The free end of arm 48 of angle 50 is provided with slots 59 through which a tie rod 60 is secured by screw 61 and nut 62.

The cutting station has a similar structure to the tracing station and the corresponding parts are correspondingly numbered but the distinction is indicated by the use of primes.

Figure 4:
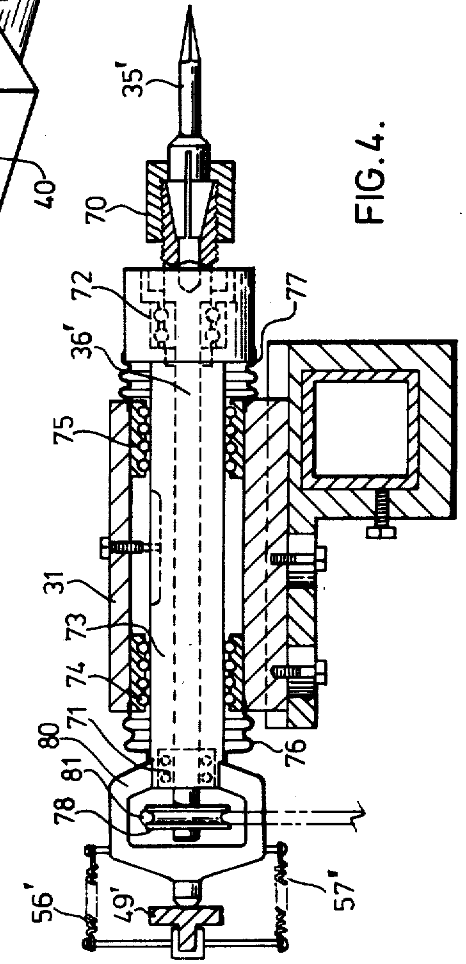
FIG. 4 is a diagrammatic view of a partial section through a cutting head and its mounting and serves to illustrate the mechanism by means of which variations in speed may be effected.
Figure 5:
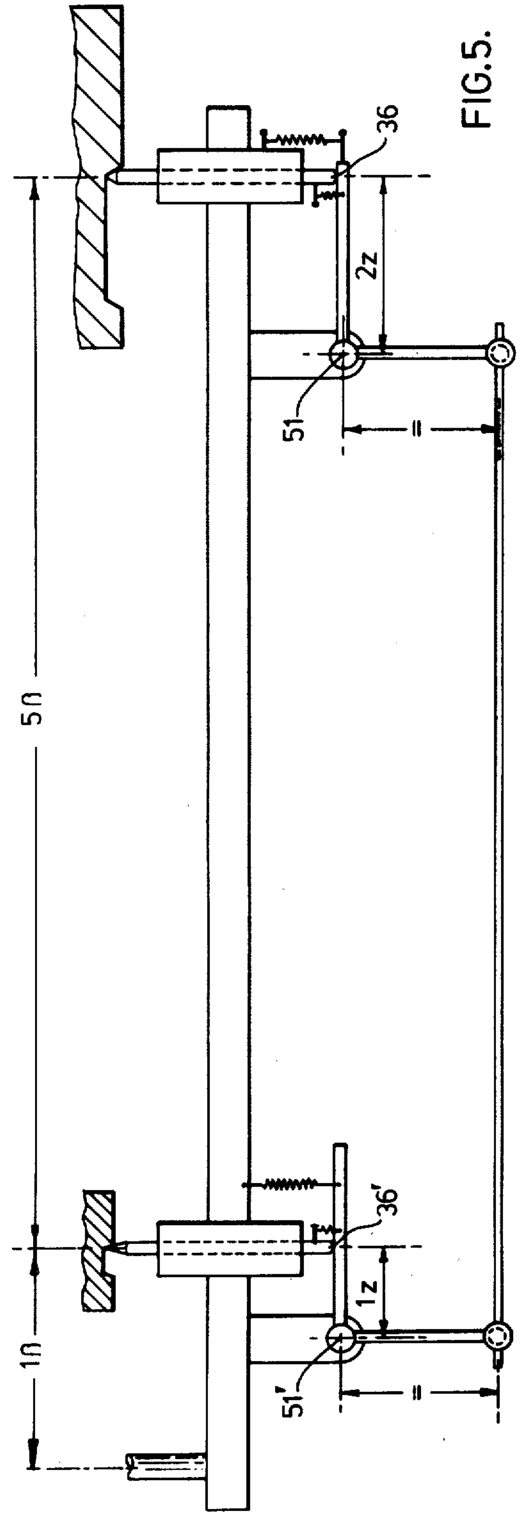
FIG. 5 is a diagrammatic plan view of a part of a pantograph in accordance with the present invention and serves to illustrate one variation in the relative proportions which may be achieved with the present invention.
Figure 6B:
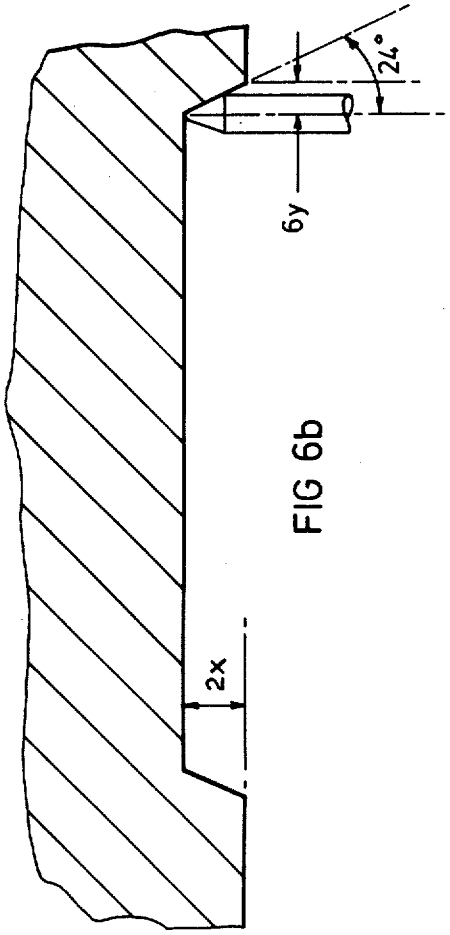
FIGS. 6A & 6B are further diagrams of the cutting head and tracing head, respectively, again to illustrate the relative proportions.
Figure 6A:
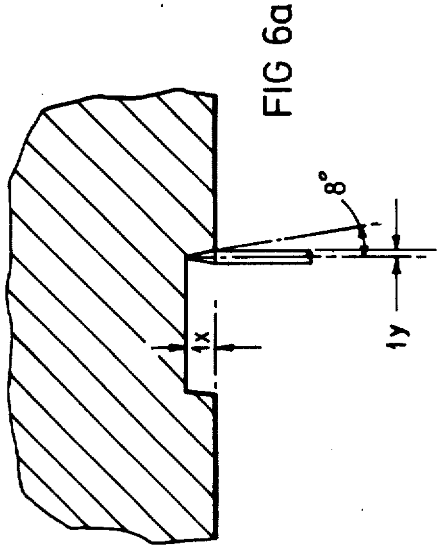

The cutting mechanisms themselves comprise a cutting tip 35' which is removably secured to a shaft 36' by a hood 70. Shaft 36 is supported on either end by rotational bearings, indicated in dotted outline, at 71 and 72. A sleeve 73 is provided external to rotational bearings 71 and 72 and this sleeve 73 is in turn supported by linear bearings 74 and 75. This structure is in turn supported by housing 31. Bearings 74, 75 and sleeve 73 are sealed by bellows such as 76 and 77. On the remote end of shaft 36' from cutting tip 35' a pulley 78 is mounted and this pulley is in turn driven by belt 79 and shaft 90. Shaft 90 may be driven by an independent source or synchronized to operate with the rotation of the chucks 16 and 17. Also in the end of sleeve 73 a plate 80 with a slot 81 is provided. This plate effects engagement with the arm 49' of the angle 50' in the manner shown in FIG. 4 and the abutting contact is maintained by springs 56' and 57'.

In the illustrations used in this description it will be noted that the relative distance between the centre of the cutting station and the centre 13 of the spindle, and the distance from the centre of the tracing station to the centre of the spindle 13 is in the ratio of 6 to 1. As a consequence the relative size between the master model from which the tracing is done, that is the model mounted on chuck 16, relative to the engraving which results on the work piece mounted on chuck 17 will be 6 to 1. It is also to be noted that the distance from the centre of the cutting head shaft 36' from the centre or the vertical axis of the spindle 51' relative to the distance from the centre of the tracing shaft 36 to the tracing shaft spindle 51 is 1:2. The depth of cut by the cutting head is therefore half the depth of the original or master model but the angle of cut or the included angle of the cut will be ⅓rd of that of the master model.

These results will be more fully understood from the description of the operation of the embodiment illustrated.

OPERATION

Initially, the master 32 which is to be copied is mounted in the chuck or work station 16 and secured by the collets or arms 31 in the manner shown.

The actual design to be copied is indicated at 33.

The blank 33 upon which the master is to be reproduced is similarly mounted on chuck or work station 17.

It will of course be understood that the respective distances of the work pieces from the centre 12 will have been previously determined.

In the embodiment the desired reduction is 1/6:1.

The tracing head 30 and the cutting head 20 are aligned with their central axes aligned with the corresponding axes on their respective work stations.

The relative depth of cut is then adjusted by the adjustment of screws 53 and 54 and 53' and 54' and their relative plates 45 and 45' in slots 43 and 43' and the securement of rod 60 is adjusted so that the tracing head tip 35 and cutting head 35' will act in unison although not in the same manner.

In the example illustrated the distance between the principal axis of the tip 35 and the pivot axis through spindle 51 is equal to twice the distance from the principal axis of the tip 35' and its corresponding pivotal axis through spindle 51'.

The chucks 16 and 17 are then set in motion in the direction indicated by the arrows and the gear 24 is also caused to move downwards.

It will of course be understood that as carriage bar 15 moves down and the chucks are rotated the tracing tip 35 will move across the face of the master or original 33 so that the entire surface will be covered eventually by the tip.

During this "downward movement" the tip 35 of course responds to the contours of the master model moving in and out according to the contour. This motion is translated by the abutting engagement between shaft 36 and arm 49 through arm 48 to arm 60 and the cutting head station.

It will be observed that springs 56, 57 and 58 serve to maintain the engagement between the tip 35 and the master model and also engagement between shaft 36 and arm 49.

At the cutting head station arms 48' and 49' will move in response to the movement of rod 60.

Arm 49' through its engagement with plate 80 causes sleeve 73 and consequently cutting tip 35' to move towards and away from the surface of the blank.

At the same time belt 79 driven from pulley 90 and by engagement with pulley 78 causes the cutting tip 35' to rotate and cut the blank 33'.

However, it will be observed that the travel of the cutting tip 35' in the lateral direction will be at half the speed of the travel of the tracing tip 35 because of their relative distances from the vertical axis of their respective spindles.

The double motion of the cutting tip 35' is accomplished by the provision of the rotary bearings 72 on shaft 36' and the linear bearings 74 on sleeve 73. The bellows 76, 77 are filled with an appropriate lubricant and in the present model have accommodated all necessary speeds.

It will be apparent that as the tracing stylus covers 1 unit horizontally the cutter head travels 1/6 units so that with the relationship between the tracing head and cutting head the ratio will be 1:1/6.

However, the tracing head moves laterally through a depth of two units and the cutting head moves at the same time through one unit. These units are not necessarily the same units as referred to in the previous paragraph with respect to the horizontal movement.

If the ratio of the cutter head 35 and tracing head 35' movements are set at 1:1, because the horizontal movement ratio of the tracing head to cutter head is 6:1 the depth of cut of the cutting tip will be 1/6 of the proportional depth or the same depth as the stylus movement in spite of the fact that the diameter ratio is 1:6 and the angle which the cutting head makes will be approximately 1/6 that of the original angle.

In the emobidment described the original angle of slope of the "lateral" wall of the master was shown as 24°. The resultant angle of the cut in the model was approximately 8°. This relationship arose because as tracing head travelled in the horizontal direction one unit the cutting head travelled 1/6 of a unit at the same time the speed of the cutting head in the lateral direction was half that of the tracing head speed in the same direction.

It will of course be evident from the foregoing description that the ratio of 1:6 is by way of example only and that the relative sizes may be adjusted by moving the cutting head 30' and tracing head 30 along the bar or moving bar 15 relative to the centre by loosening and resecuring screws at the desired position.

It will also be apparent that the tracing head 30 and cutting head 30' may be interchanged very simply to give an enlarged copy relative to the master or original.

Further to provide alternative relationships between the master and the reproduction the cutting head and tracing head may be mounted on opposite sides of centre. The drive mechanism would require to be adjusted but it will be apparent that the range of variations in relative size, depth of cut and definitions is almost infinite. It should also be evident that the "throw" of the tracing head stylus and the cutting head stylus may be varied in ways other than moving plate 45 relative to arm 42. For example, rod 60 may be moved relative to arms 48 and 48', or the angles between arms 48 and 49 and 48' and 49' may be varied. In applications where there are relatively large flat areas to be copied the motor means may also be provided with an accelerated response to speed up the copying process. It may be necessary in certain situations to provide copies with lesser or greater definition than the original or master.

In the description of the preferred embodiment the copy had an angle of cut of 8° as defined. Previously on this type of equipment, the minimum angle of cut by the same definition was 15°.

For the purposes of this specification this improved performance may be regarded as greater definition. Previously, the tracing head would either have difficulty climbing such slopes on the master model so that it frequently jumped or stopped with the result that a corresponding movement was exhibited by the cutting head and a fault resulted in the copy.

To achieve lesser definition in the copy relative to the model the ratio of the relative distances between the respective arm privot centres 61 and 61' and the cutting and tracing head axes 36 and 36' should be altered so that the cutting head travel speed is slower relative to the tracing head or stylus travel speed in the lateral direction.

It may be that the speed of the tracing head 35 across the face of the master model may have to be varied either because of the contours or because of the material upon which the copy is being made.

From the foregoing description it will be evident that the machine which is the subject of the present invention provides an economical, efficient and accurate means for reproducing or producing copies of originals.

It will of course be evident to those skilled in the art that alternate means or modifications may be employed without departing from the spirit of the invention as defined in the appended claims.

The embodiments of the invention in which an exclusive property or privilege is claimed are defined as follows:

1. A pantograph machine for producing a copy of a master model which comprises: a first centre; a tracing station; and a cutting station;

said tracing station including means for holding and rotating said master model and a tracing head having a tracing stylus engageable with an adjacent surface of said master model, said cutting station including means for holding and rotating a blank upon which said master is to be reproduced and a cutting head having a cutting tip for cutting said copy on said blank;

means for moving said tracing head and said cutting head through a first arc about said first centre;

individual means for maintaining said tracing stylus and said cutting tip in respective engagement with the master model and blank respectively, means for translating movement of said tracing stylus in a lateral direction into movement of said cutting tip in a corresponding direction, means for imparting a rotary cutting motion to said cutting stylus; and means for varying the relative travel of said cutting tip and said tracing stylus in a lateral direction to vary, the depth of cut of said cutting tip on said blank relative to the depth of cut on said master model;

said moving means comprising a bar pivoted at said first center and upon which the tracing head and cutting head are mounted, said translating means comprising a mechanical linkage between the tracing apparatus and the cutting tip, and said varying means including means for adjusting said mechanical linkage.

2. A pantograph machine according to claim 1 wherein said mechanical linkage includes a two-arm lever mounted on the tracing head for pivotal movement about an axis, said adjusting means being operable to adjust the position of the two-arm lever on the tracing head to vary the distance of said axis from the tracing stylus.

3. A pantograph machine according to claim 1 wherein said mechanical linkage includes a two-arm lever mounted on the cutting head for pivotal movement about an axis, said adjusting means being operable to adjust the position of the two-arm lever on the cutting head to vary the distance of said axis from the cutting tip.

* * * * *